United States Patent [19]

Shimizu

[11] Patent Number: 5,768,485
[45] Date of Patent: Jun. 16, 1998

[54] PRINTING APPARATUS FOR BIT MAP DATA IN UNIT OF PAGE

[75] Inventor: Masaaki Shimizu, Sagamihara, Japan

[73] Assignee: Canon Kabushiki Kaisha, Tokyo, Japan

[21] Appl. No.: 984,840

[22] Filed: Dec. 3, 1992

[30] Foreign Application Priority Data

Dec. 6, 1991 [JP] Japan .................................. 3-323052

[51] Int. Cl.$^6$ .................................................. G06K 15/00
[52] U.S. Cl. ....................................... 395/116; 395/115
[58] Field of Search ............................... 395/112, 113, 395/114, 110, 115, 116, 101

[56] References Cited

U.S. PATENT DOCUMENTS

| | | | |
|---|---|---|---|
| 4,901,249 | 2/1990 | Shiota | 395/115 |
| 4,968,159 | 11/1990 | Sasaki et al. | 395/112 |
| 4,975,859 | 12/1990 | Takagishi et al. | 364/519 |
| 4,992,957 | 2/1991 | Aoyama et al. | 395/112 |
| 5,016,001 | 5/1991 | Minagawa et al. | 340/747 |
| 5,165,014 | 11/1992 | Vassar | 395/101 |
| 5,220,645 | 6/1993 | Nakajima | 395/113 |
| 5,222,200 | 6/1993 | Callister et al. | 395/114 |
| 5,228,118 | 7/1993 | Sasaki | 395/112 |
| 5,293,466 | 3/1994 | Bringmann | 395/114 |
| 5,367,618 | 11/1994 | Ishida | 395/110 |

FOREIGN PATENT DOCUMENTS

| | | |
|---|---|---|
| 452131 | 10/1991 | European Pat. Off. . |
| 2251107 | 6/1992 | United Kingdom . |

Primary Examiner—Matthew M. Kim
Assistant Examiner—Steven P. Sax
Attorney, Agent, or Firm—Fitzpatrick, Cella, Harper & Scinto

[57] ABSTRACT

A printing apparatus such as laser beam printer or page printer comprises a developing unit to sequentially develop received print data into a development memory and controller to control the order to generate the developed information from the development memory on the basis of information which has been set by a host computer or the printing apparatus. The print data includes a character code, position information to develop the character code into the development memory, and information indicative of a font pattern which is used when developing. The development memory is a bit map memory of at least page. The developing unit develops the received print data into the development memory on the basis of a page describing language.

14 Claims, 16 Drawing Sheets

FIG. 9A

RIGHT SIDE

RIGHT SIDE

|   | PRODUCT NAME | PRICE |
|---|---|---|
| 1 | CAKE | ¥200 |
| 2 | HAM | ¥500 |
| 3 | PIZZA PIE | ¥800 |
| 4 | CONTAINER | ¥50 |
|   |   |   |
|   | (TOTAL) | ¥1550 |

(RIGHT SIDE — inverted at bottom)

|   | PRODUCT NAME | PRICE |
|---|---|---|
| 1 | CAKE | ¥200 |
| 2 | HAM | ¥500 |
| 3 | PIZZA PIE | ¥800 |
| 4 | CONTAINER | ¥50 |
|   |   |   |
|   | (TOTAL) | ¥1550 |

(RIGHT SIDE — inverted at bottom)

FIG. 11A
RIGHT SIDE
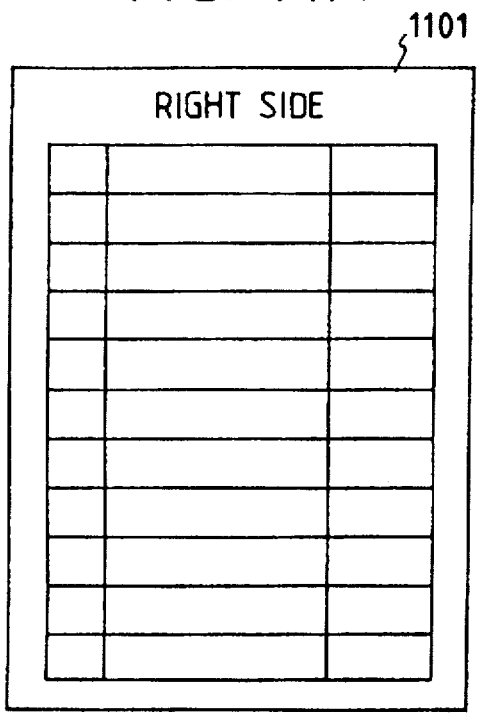
FIG. 11B
REVERSE SIDE
FIG. 11C
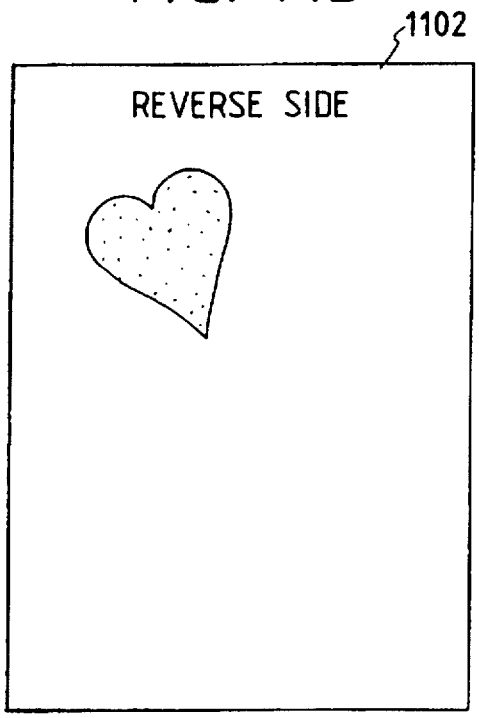
FIG. 11D
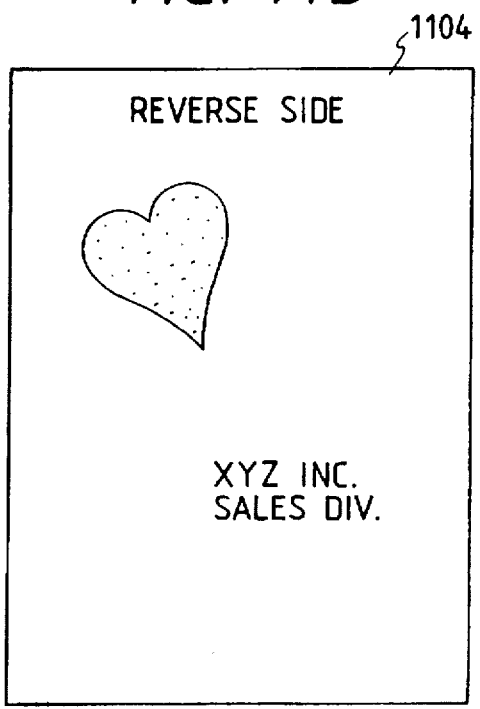

FIG. 12A
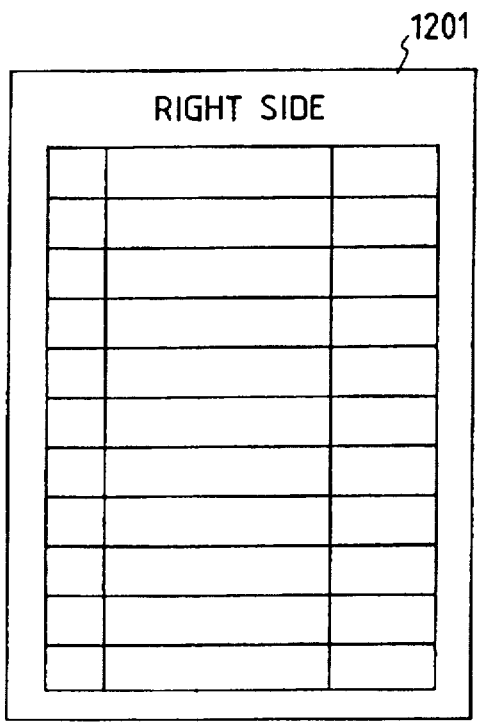
FIG. 12B
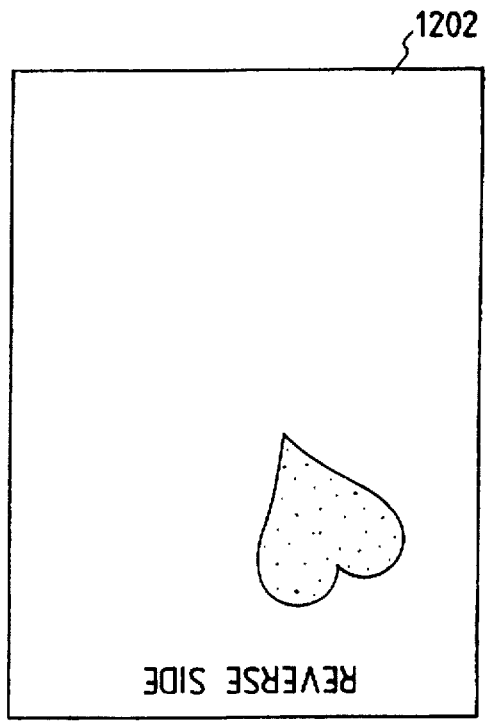
FIG. 12C
| | RIGHT SIDE | |
|---|---|---|
| | PRODUCT NAME | PRICE |
| 1 | CAKE | ¥200 |
| 2 | HAM | ¥500 |
| 3 | PIZZA PIE | ¥800 |
| 4 | CONTAINER | ¥50 |
| | | |
| | (TOTAL) | ¥1550 |
| | | |
| | | |
| | | |
| | | |
FIG. 12D
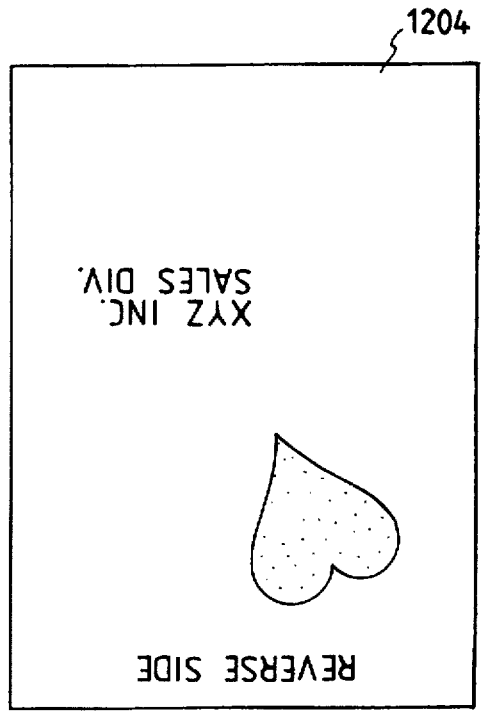

FIG. 13A
```
      PRODUCT NAME  PRICE
   1  CAKE          ¥200
   2  HAM           ¥500
   3  PIZZA PIE     ¥800
   4  CONTAINER     ¥50
      (TOTAL)       ¥1550
```
FIG. 13B
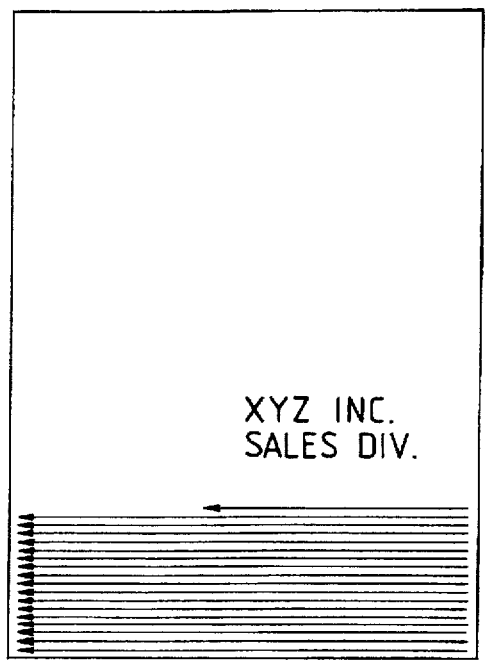
FIG. 14A
```
      PRODUCT NAME  PRICE
   1  CAKE          ¥200
   2  HAM           ¥500
   3  PIZZA PIE     ¥800
   4  CONTAINE      ¥50
      (TOTAL)       ¥1550
```
FIG. 14B
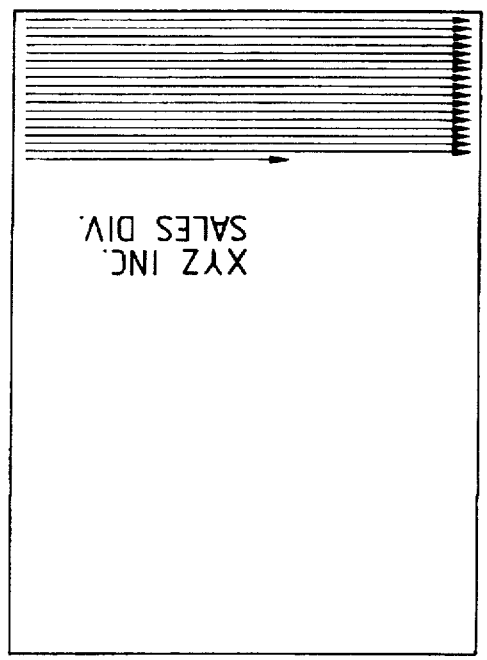

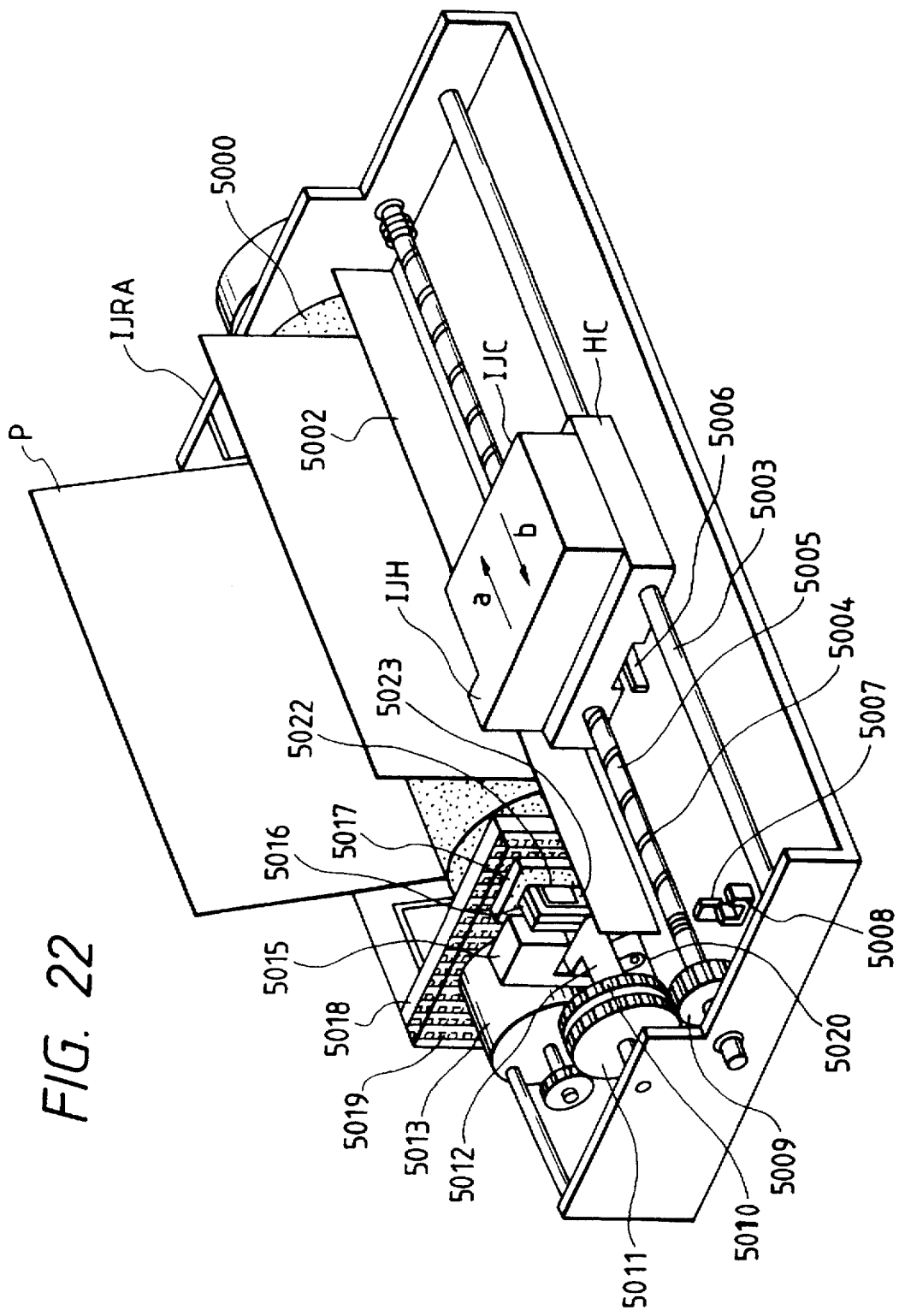

PRINTING APPARATUS FOR BIT MAP DATA IN UNIT OF PAGE

BACKGROUND OF THE INVENTION

1. Field of the Invention

The invention relates to a printing apparatus and, more particularly, to a printing apparatus in which data of a page unit is received from a host computer, a character code or graphic data transmitted from the host computer is developed into a bit map, image data transmitted from the host computer is developed, and bit map information of the page unit is formed as output information and is printed and generated.

As an actual printer mechanism, the invention relates to a printing apparatus using an electrophotographic process such that the bit map information of the page unit is converted into the image signal and transferred from the developing means to the printer mechanism, the printer mechanism forms an image corresponding to the bit map information of the page unit onto a photo sensitive drum by a photo sensitive material such as a toner or the like by using a light emitting device such as laser beam, LED array, liquid crystal shutter, or the like synchronously with the image signal, the formed image is transferred to a paper (ordinary paper), and the visible image transferred to the paper (ordinary paper) is generated as stable print result by using a fixing device at a high temperature and a high pressure.

2. Related Background Art

Hitherto, such a kind of printing apparatus is constructed by: a controller section for receiving print data from a host computer and processing and converting into an image signal and transmitting the image signal to a printer mechanism section (printer engine); and the printer mechanism section (printer engine) for forming a visible image onto a paper (ordinary paper) by using the electrophotographic process from the image signal transmitted from the controller section and generating. On the basis of the print data (character code/figure/image, printing position, size designation, etc.) received from the host computer, the controller section develops the print information of one page into an image memory as a bit map in accordance with the performance of the printer engine, converts the result of the development in the image memory into the image signal, and transfers the image signal to the printer engine, thereby obtaining a print output.

The printer engine uses a general method such that on the basis of the control information from the controller, a feed conveying system in the printer engine is made operative, an image is formed onto a photo sensitive drum by a photo sensitive material such as a toner or the like by using a light emitting device such as laser beam, LED array, liquid crystal shutter, or the like from the image signal which is transmitted from the controller section, the formed image is transferred to the paper (ordinary paper) fed by the feed conveying system, and the visible image transferred to the paper (ordinary paper) is further obtained as a stable print result by using a fixing device at a high temperature and a high pressure.

In such a printing apparatus, therefore, in case of performing a printing process to a pre-print sheet, the pre-print sheet must be set into a cassette in accordance with a logic of the paper feed and delivery and transfer of the controller or a process of the printer engine.

In the above printing apparatus, in case of printing onto a paper such as a pre-printed sheet, the pre-print sheet must be generally set into the sheet cassette in accordance with the paper feed, transfer, and delivery mechanism of the printing apparatus.

That is, in order to obtain a print result as shown by reference numeral 902 in FIG. 9B for a pre-print sheet as shown by reference numeral 901 in FIG. 9A, the pre-print sheet must be set to the sheet cassette as shown in FIG. 5. If the pre-print sheet is set as shown in FIG. 6, an erroneous print result as shown at 1002 in FIG. 10B will be obtained.

Such a troublesomeness further increases in the printing apparatus which can print both sides.

For instance, in case of a printing apparatus such that the even-number page (reverse side) is previously printed to each sheet in the both-side printing mode, the pre-print sheet must be turned back and set into the cassette.

In such a printing apparatus, accordingly, in case of continuously performing the one-side printing and both-side printing, there occurs troublesome operations such that each time the one-side printing mode and the both-side printing mode are switched, the front/back directions or right/reverse sides of the pre-print sheet are changed and, thereafter, the sheet is again set to the sheet cassette.

When the printing process is erroneously executed in a state in which the pre-print sheet has been set to the sheet cassette in the direction opposite to the printer mechanism of the printing apparatus, many useless sheets are delivered.

In case of printing to the pre-print sheet as mentioned above, there occurs a problem such that a possibility such that the complicated operations occur or the useless sheets which are vainly delivered is high.

SUMMARY OF THE INVENTION

The invention is made to solve the above problems and it is an object of the invention to always obtain a correct print result for a pre-print sheet irrespective of the methods for paper feed/delivery and transfer of a printing apparatus by designating the right/reverse sides and the front/back directions of a sheet set to a cassette by a received command or an operation of an operator's console.

To accomplish the above object, according to the invention, there is provided a printing apparatus comprising: developing means for sequentially developing received print data into a development memory; and control means for controlling the order for reading out the developed information from the development memory on the basis of set information.

The printing apparatus also comprises: developing means for developing received print data into a development memory; and control means for controlling the order for supplying the received print data into the development memory on the basis of the set information.

BRIEF DESCRIPTION OF THE DRAWINGS

FIG. 9A shows a pre-print sheet placed in the normal direction;

FIG. 9B shows an example of a printing result using the pre-print sheet of FIG. 9A;

FIG. 10A shows a pre-print sheet placed in an abnormal direction;

FIG. 10B shows an example of a printing result using the pre-print sheet of FIG. 10A;

FIG. 11A shows the right side of a pre-print sheet;

FIG. 11B shows the reverse side of the pre-print sheet of FIG. 11A;

FIG. 11C shows an example of a printing result using the pre-print sheet of FIG. 11A;

FIG. 11D shows an example of a printing result using the pre-print sheet of FIG. 11B;

FIG. 12A shows the right side of a pre-print sheet;

FIG. 12B shows the reverse side of the pre-print sheet of FIG. 12A in which these sides are placed in opposite directions;

FIG. 12C shows an example of a printing result using the pre-print sheet of FIG. 12A;

FIG. 12D shows an example of a printing result using the pre-print sheet of FIG. 12B;

FIG. 13A shows the right side of a printed sheet with a direction in which corresponding bit map data are read;

FIG. 13B shows the reverse side of a printed sheet with a direction in which corresponding bit map data are read;

FIG. 14A shows the right side of a printed sheet with a direction in which corresponding bit map data are read;

FIG. 14B shows the reverse side of a printed sheet with a direction in which corresponding bit map data are read;

FIG. 22 shows a perspective view of another printing apparatus in accordance with the present invention.

DETAILED DESCRIPTION OF THE PREFERRED EMBODIMENTS

A construction of the invention will be described hereinbelow with reference to the drawings.

Figure 1:
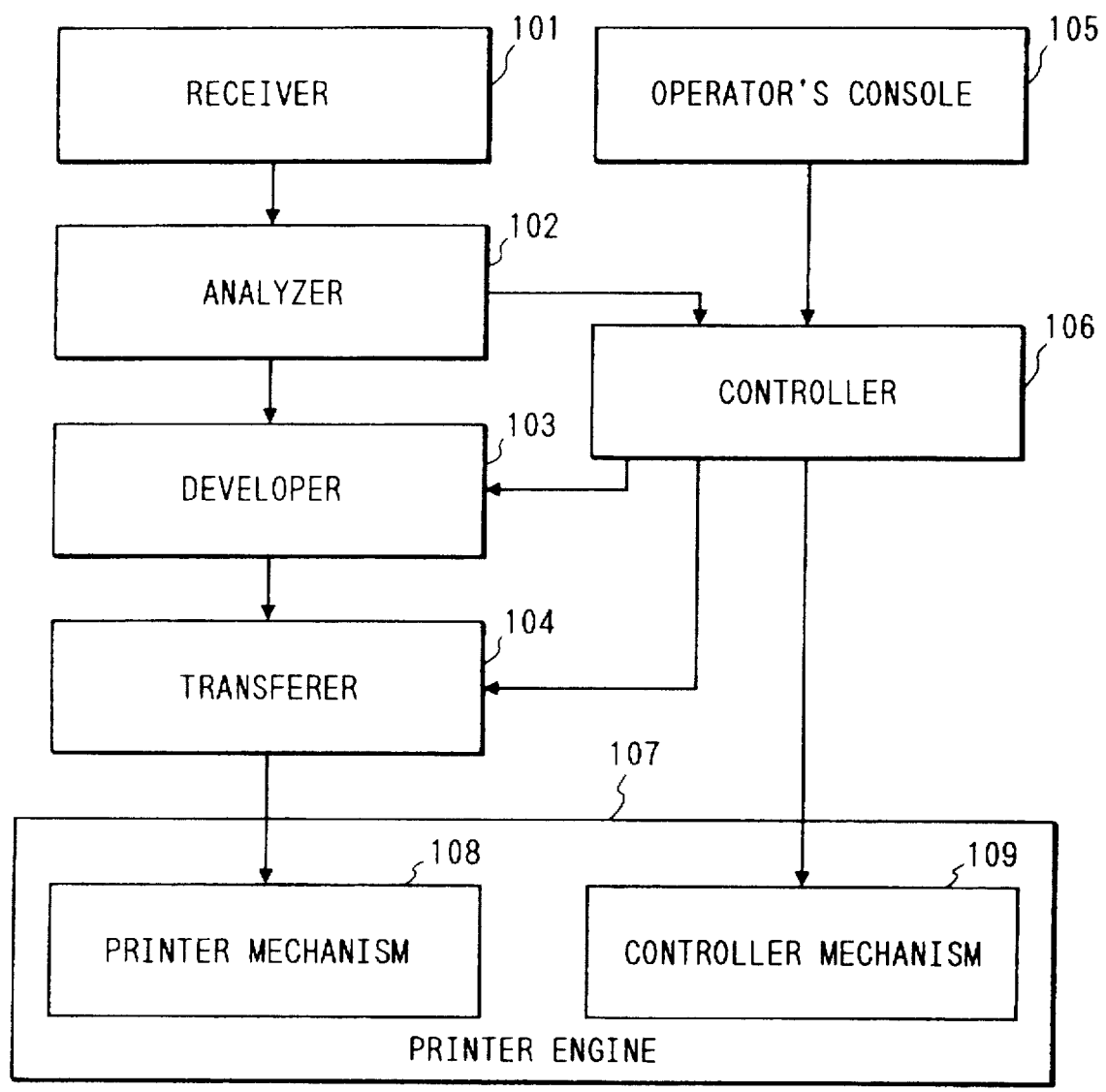
FIG. 1 is a schematic block diagram for a printing apparatus in accordance with the present invention.

FIG. 1 is a schematic block diagram showing a function construction of a printing apparatus in the invention and shows a function construction of a laser beam printer shown in FIGS. 2 and 3, which will be explained hereinlater, and also shows a function construction of an ink jet printer shown in FIG. 22, which will be explained hereinlater.

The printing apparatus to which the invention is applied is not limited to the laser beam printer or ink jet printer but can be also applied to a printing apparatus of another printing type.

In FIG. 1, reference numeral 101 denotes receiver for receiving input data transmitted from a host computer.

The input data comprises: print data including data such as character code, graphics, image, or the like which is used to actually perform a printing process, developing position information into a bit map memory, information indicative of a font pattern which is used, and the like; control data for a printing mechanism section (printer engine) 107; and the like. The control data denotes, for instance, control data such as to designate switching controls between the feed mode (cassette feed, manual feed) and the delivery mode and between the one-side printing mode and the both-side printing mode or the like and includes setting (front/back direction, right/reverse side, and the like) information of a pre-print sheet.

The above data can be also expressed by a page describing language (PDL).

Reference numeral 102 denotes an analyzer for analyzing input data received by the receiver 101 and dividing the input data into the print data and the control data.

Reference numeral 103 denotes a developer for developing the print data divided by the analyzer 102 as output data into bit map information of at least one page.

Reference numeral 104 denotes transfer means for transferring the bit map information developed by the developer 103 to a printer mechanism 108 of the printer engine 107.

Reference numeral 105 denotes an operator's console for displaying a state of the printing apparatus or for designating setting (front/back direction, right/reverse side, and the like) information of a pre-print sheet for the printing apparatus by an operator.

Reference numeral 106 denotes a controller for judging the setting information of the pre-print sheet set in a cassette on the basis of the control data divided by the analyzer 102 or the setting information of the pre-print sheet designated from the operator's console 105 and for controlling the developer 103, transfer means 104, and a controller mechanism 109 of the printer engine 107.

The control data can be also expressed by a page describing language (PDL).

Reference numerals 101 to 106 denote functions in the controller of the printing apparatus.

Reference numeral 107 denotes the actual printing mechanism section (printer engine); 108 the printer mechanism in the printer engine; and 109 the controller mechanism to control a feed conveying system (paper feed mode and delivering process) or the like in the printer engine.

Figure 2:
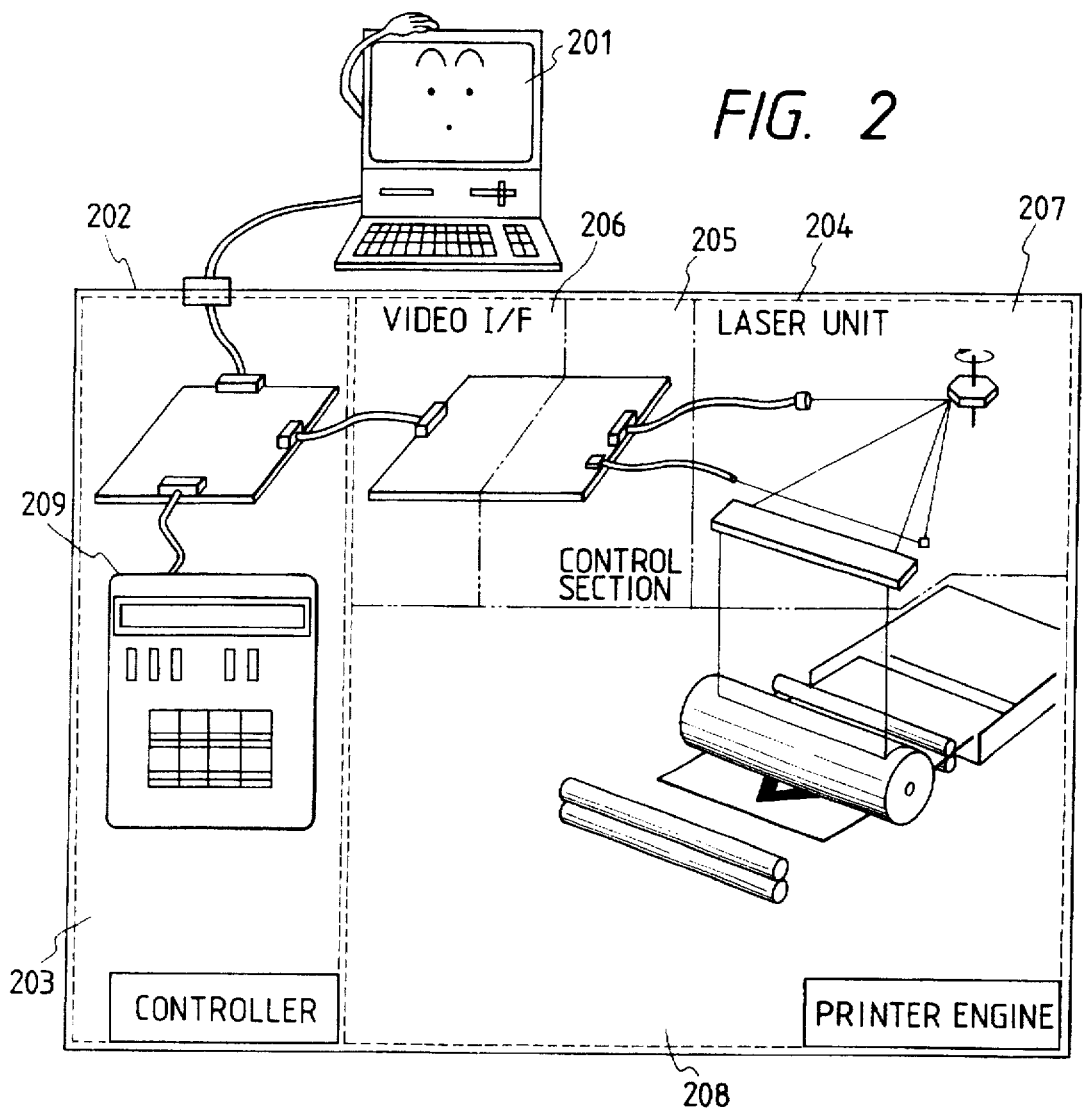
FIG. 2 shows a general structure of a printing apparatus in accordance with the present invention.
Figure 3:
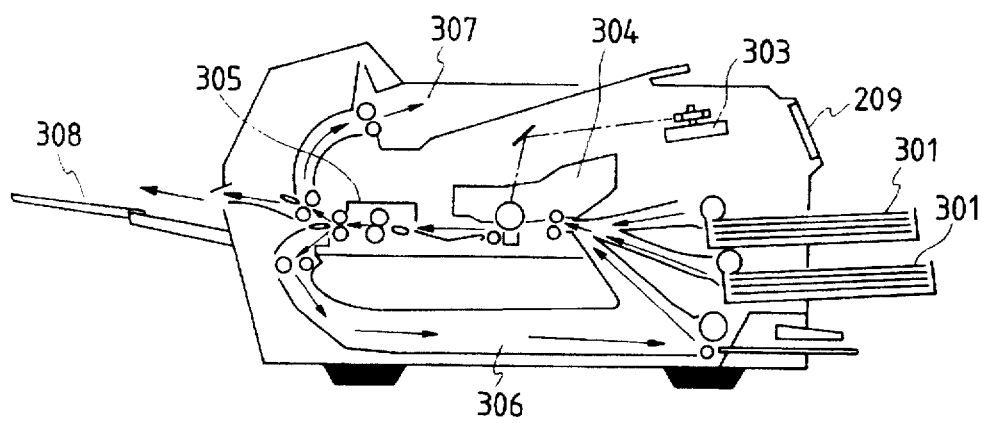
FIG. 3 shows a paper feeding and transportation system of the printing apparatus of FIG. 2.

FIGS. 2 and 3 show general constructions in the printing apparatus.

Reference numeral 201 in FIG. 2 denotes a host computer to transmit various kinds of print data and various kinds of control data to the printing apparatus.

Reference numeral 202 in FIG. 2 denotes an example of the first printing apparatus to which the invention can be applied (a laser beam printer using a laser beam as a light emitting device is shown here); 203 a controller of the printing apparatus; and 204 a printing mechanism section (printer engine) of the printing apparatus.

Reference numeral 205 in FIG. 2 denotes a control section to control the electrophotographic process, paper feed conveying system, and optical system and 206 indicates a video interface for receiving an image signal from the controller 203 in FIG. 2, for receiving control commands from the controller, and for transmitting a status of the printer engine to the controller.

Reference numeral 207 in FIG. 2 denotes an optical system in the printer engine 204 in FIG. 2.

Reference numeral 208 in FIG. 2 denotes an electrophotographic process or paper feed conveying system in the printer engine 204 in FIG. 2.

Reference numeral 209 in FIG. 2 denotes an operator's console in the printing apparatus.

FIG. 3 is a diagram showing the feed conveying system 208 in FIG. 2.

Reference numeral 301 in FIG. 3 denotes a feed cassette.

Reference numeral 209 in FIG. 3 denotes the operator's console.

Reference numeral 303 in FIG. 3 denotes a rotary mirror to irradiate a laser beam onto a photo sensitive drum; 304 a photo sensitive drum; and 305 a fixing device.

Reference numeral 306 in FIG. 3 denotes a sheet reversing unit in the both-side printing mode and 307 and 308 indicate discharge trays.

An arrow in the diagram indicates the conveying direction of the sheet in the feed conveying system.

Figure 4:
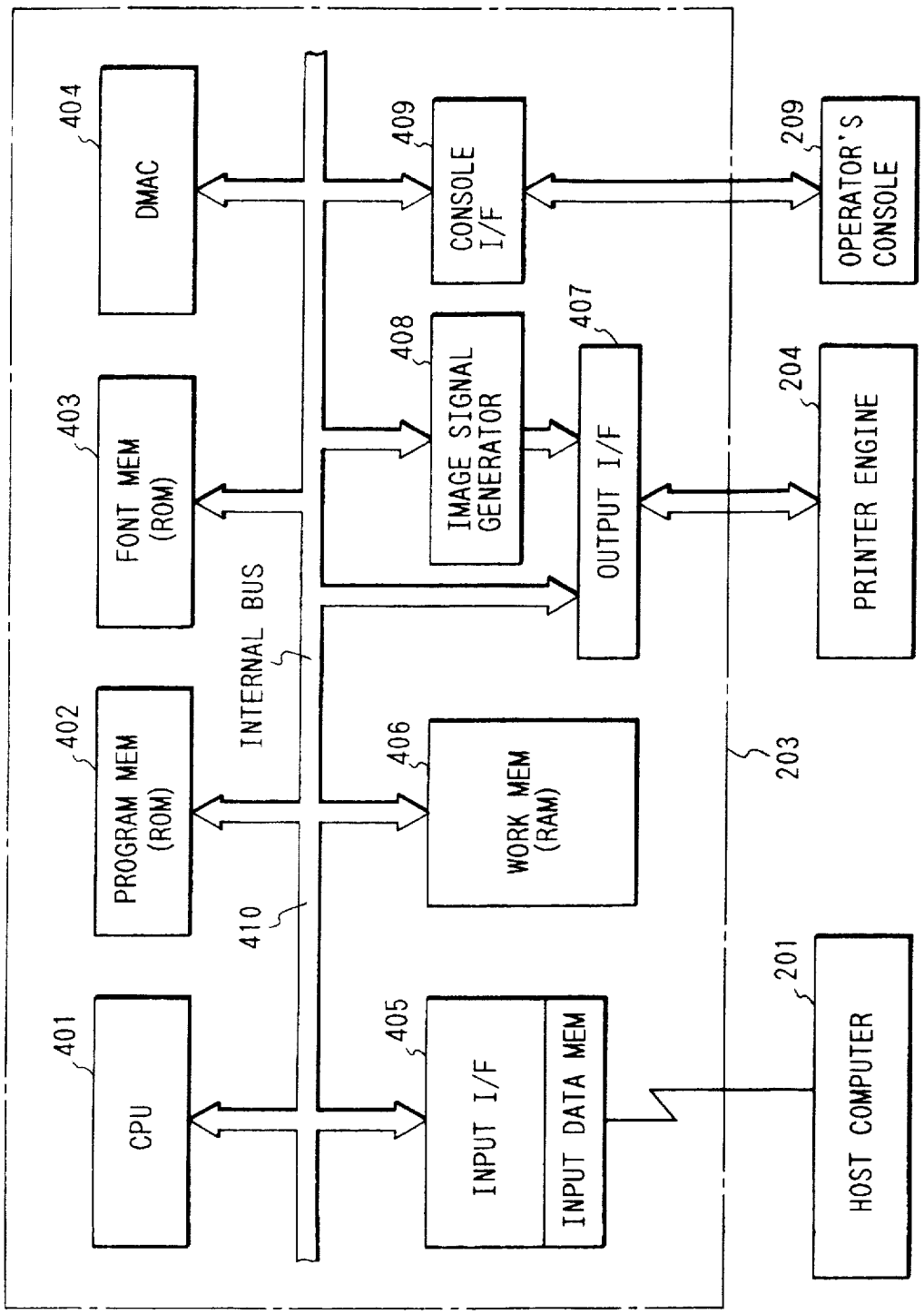
FIG. 4 is a block diagram for controller 203 shown in FIG. 2.

FIG. 4 shows a block diagram of the controller 203 in FIG. 2.

Figure 19:
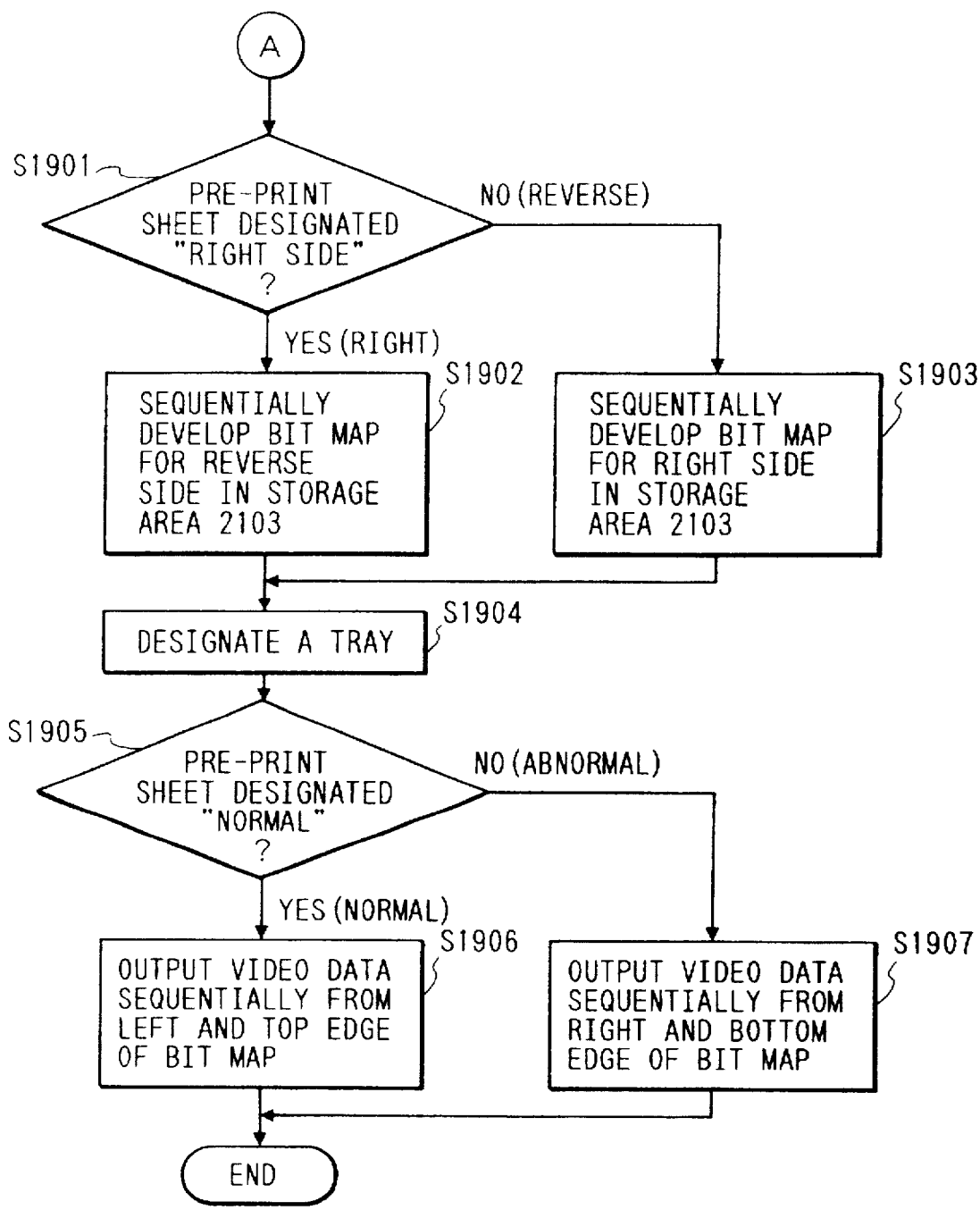
FIG. 19 shows a flowchart for the printing process in double sided printing.
Figure 20:
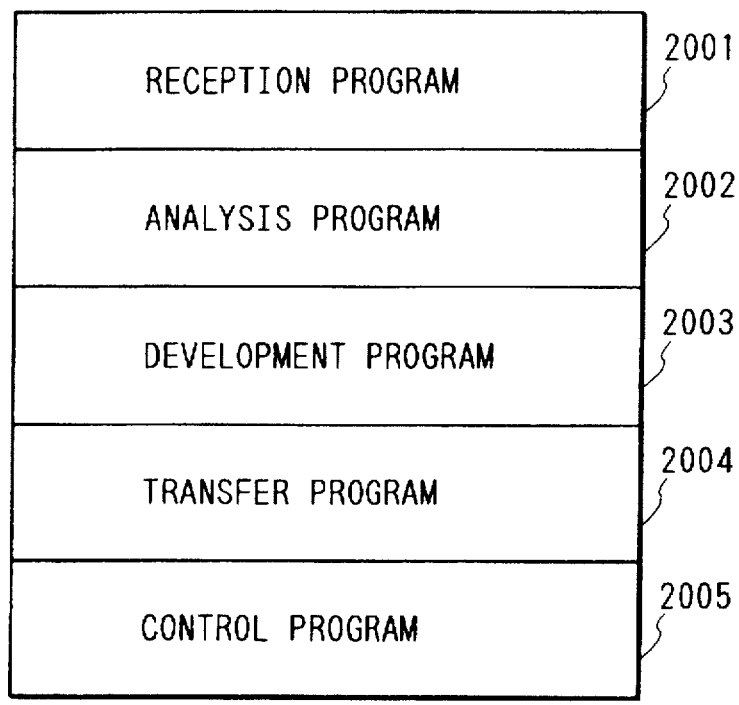
FIG. 20 shows control programs stored in program memory 402 of FIG. 4.

In FIG. 4, reference numeral 401 denotes a central processing unit (CPU) to control the whole controller and 402 indicates a program memory in which a program to control the controller has been stored. For instance, the program memory 402 is constructed by an ROM (read only memory) and stores various kinds of programs to execute processes in flowcharts shown in FIGS. 16, 17, 18 and 19. That is, as shown in FIG. 20, a reception program 2001, an analysis program 2002, a development program 2003, a transfer program 2004, and a control program 2005 are stored in the program memory 402. Reference numeral 403 denotes a memory in which font information to develop a character code into a bit map has been stored. For example, the memory 403 is constructed by an ROM (read only memory). Reference numeral 404 denotes a hardware circuit to transfer the bit map information in which the print data has been developed to an image signal generator 408. For examples the hardware circuit 404 is constructed by a DMAC (direct memory access controller) or FIFO. Reference numeral 405 denotes a data input interface circuit to connect the host computer 201 and the controller 203. The I/F circuit 405 has a memory to temporarily store input data.

Figure 21:
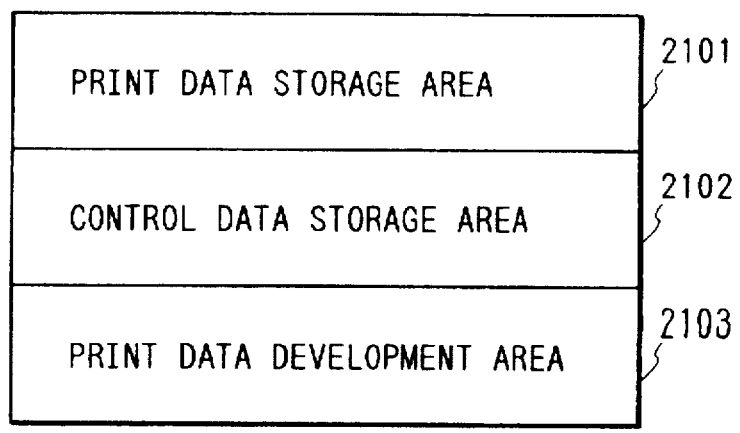
FIG. 21 shows storage areas of work memory 406 of FIG. 4.

Reference numeral 406 denotes a work memory which is necessary to make the various kinds of programs stored in the program memory 402 operative. For example, the work memory 406 is constructed by an RAM (random access memory). On the other hand, as shown in FIG. 21, the work memory 406 also includes a print data storage area 2101, a control data storage area 2102, and a print data development area 2103 of at least one page.

Reference numeral 407 denotes a data output interface circuit to connect the controller 203 and the printer engine 204; 408 the image signal generator for generating the image signal from the bit map information which has been developed in the print data development area 2103 of at least one page synchronously with the printer engine 204; and 409 a console interface to connect the operator's console 209 and the controller 203.

They are executed by the CPU 401. Reference numeral 410 denotes an internal bus to connect each of the above memories and each of the above circuits and the CPU 401.

A concept of the invention will now be described in accordance with the flowcharts of FIGS. 16 to 19 with reference to FIGS. 5 to 15.

Figure 16:
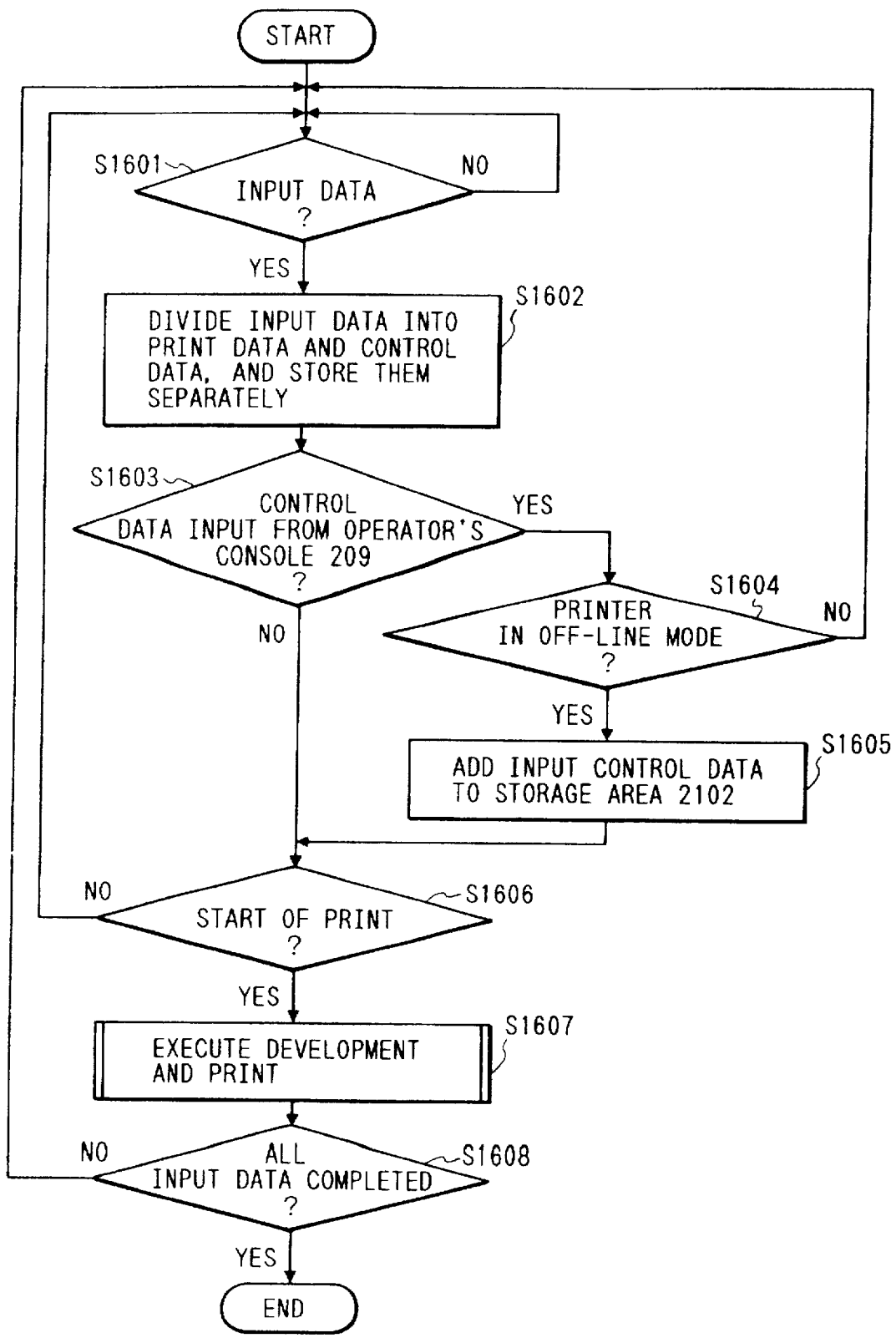
FIG. 16 shows a flowchart for the entire printing process in accordance with the present invention.

The flowchart of FIG. 16 shows a flow of the whole printing process.

Figure 5:
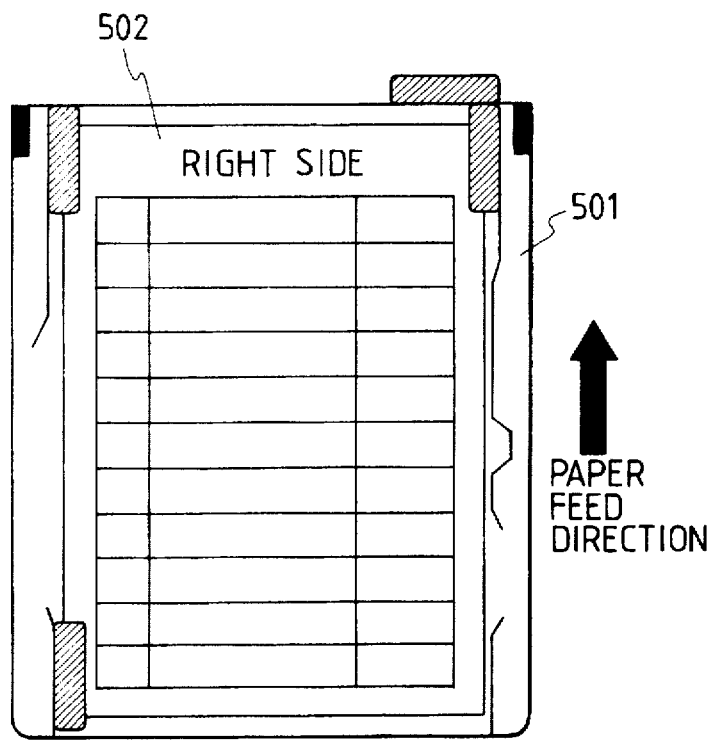
FIG. 5 shows a positional relation between a paper cassette and a pre-print sheet in which they are placed in the same direction.
Figure 6:
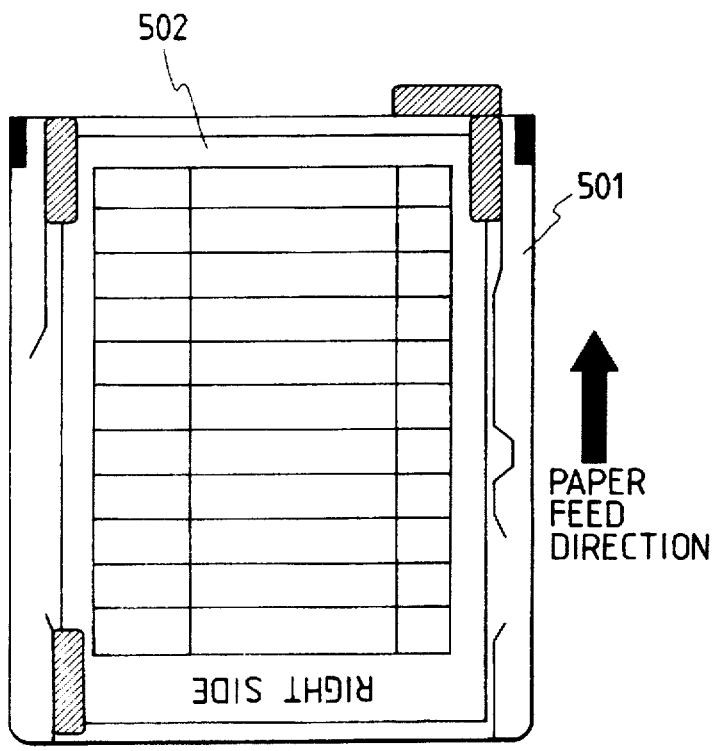
FIG. 6 shows another positional relation between the paper cassette and the pre-print sheet in which they are placed in opposite directions.

FIGS. 5 and 6 show positional relations between the feed cassette and the pre-print sheet. In FIGS. 5 and 6, reference numeral 501 denotes a feed cassette and 502 indicates a pre-print sheet. FIG. 5 shows a state in which the direction of the pre-print sheet coincides with the feeding direction and such a state will be referred to as a "NORMAL" status hereinbelow. FIG. 6 shows a state in which the direction of the pre-print sheet and the feeding direction are opposite and such a state will be referred to as an "ABNORMAL" status hereinafter.

By previously indicating whether the pre-print sheet is in the NORMAL state or ABNORMAL state by the control data from the host computer or the setting information of the pre-print sheet from the operator's console 209, the correct printing process is executed after that. The control data can be also expressed by the page describing language (PDL).

First, in step S1601, the reception program 2001 discriminates whether the input data has been stored in the input data memory to temporarily store the input data in the data input interface circuit 405 or not. If there is the input data, step S1602 follows. If no input data exists, the processing routine is returned to the first step.

In step S1602, the analysis program 2002 divides the input data into the print data and the control data and respectively stores into the print data storage area 2101 and control data storage area 2102 in the work memory 406.

In step S1603, when the setting information of the pre-print sheet by the operation of the operator's console 209 is supplied through the console interface 409, a check is made in step S1604 to see if the printing apparatus is in the OFF-line mode or the ON-line mode.

When it is determined in step S1604 that the printing apparatus is in the OFF-line mode, the input control data is added and stored into the control data storage area 2102 in the work memory 406 in step S1605.

On the other hand, when it is decided in step S1604 that the printing apparatus is in the ON-line mode, the processing routine is returned to step S1601. The hardware can be also constructed so as to always reject the console operation in the case where the printing apparatus maintains the ON-line mode by combining the processes in steps S1603 and S1604.

In the next step S1606, a check is made to see if the printing is started or not on the basis of the paper delivery code in the control data.

When it is decided in step S1606 that the printing is not started yet, the processing routine is returned to step S1601.

On the other hand, when it is determined in step S1606 that the printing is started, developing and printing processes, which will be explained hereinlater, are executed in step S1607.

If all of the input data is not yet developed and printed in step S1608, the processing routine is returned to step S1601. If all of the input data was developed and printed, the processing routine is finished.

The developing and printing processes in step S1607 of the flowchart shown in FIG. 16, namely, processes regarding the pre-print sheet and the transferring direction of the image signal in the one-side printing mode will now be described with reference to the flowchart of FIG. 17.

First, in step S1701, the development program 2003 sequentially develops the bit map of one page into the print data development area 2103 of at least one page in the work memory 406 from the print data stored in the print data storage area 2101 in the work memory 406 by using the font information stored in the font memory 403.

In step S1702, the control program 2005 discriminates whether the pre-print sheet has been designated to the NORMAL status or not on the basis of the control data stored in the control data storage area 2102 in the work memory 406, thereby controlling the transfer program 2004.

When it is determined in step S1702 that the pre-print sheet is designated to the NORMAL status, step S1703 follows and the transfer program 2004 sequentially reads out the bit map information from the left and top edge of the developed bit map through the hardware circuit DMAC 404 and data output interface 407 to transfer the bit map information in which the print data has been developed to the image signal generator 408. The read-out bit map information is supplied to the printer engine 107 as an image signal and printed.

That is, as shown by 1301 in FIG. 13, by sequentially reading out the bit map information from the developed bit map, the print result as shown by 902 in FIG. 9 is generated to the pre-print sheet as shown by 901 in FIG. 9.

On the other hand, when it is determined in step S1702 that the pre-print sheet has been designated to the ABNORMAL status, step S1704 follows and the transfer program 2004 sequentially reads out the bit map information from the right and bottom edge of the developed bit map through the hardware circuit DMAC 404 and data output interface 407 to transfer the bit map information in which the print data has been developed to the image signal generator 408. The read-out bit map information is supplied to the printer engine 107 as an image signal and printed. That is, by sequentially reading out the bit map information as shown by 1302 in FIG. 13 from the developed bit map, the print result as shown by 902 in FIG. 9 is generated to the pre-print sheet as shown by 901 in FIG. 9.

In the above embodiment, the developed bit map is set to the same direction as the setting direction of the pre-print sheet and the bit map information is read out. However, it is also possible to construct in a manner such that the bit map itself is developed in the same direction as the setting direction of the pre-print sheet and the bit map information is always read out from the left and top edge and is generated as an image signal.

The developing and printing processes can be also executed on the basis of the page describing language (PDL).

Figure 18:
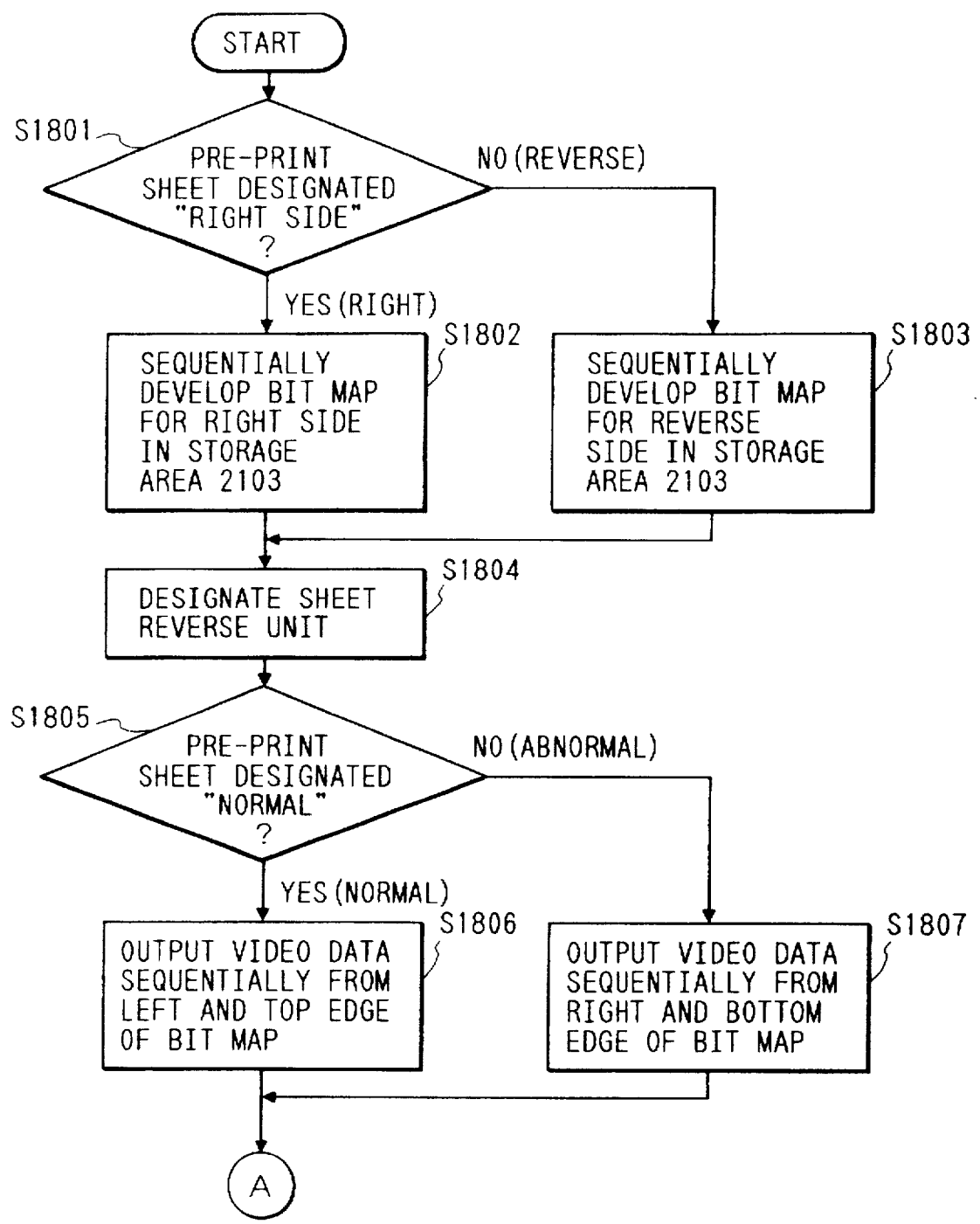
FIG. 18 shows a flowchart for the printing process in double sided printing.

Processes regarding the transferring directions of the pre-print sheet and image signal in the both-side printing mode will now be described with reference to the flowcharts of FIGS. 18 and 19.

Figure 7:
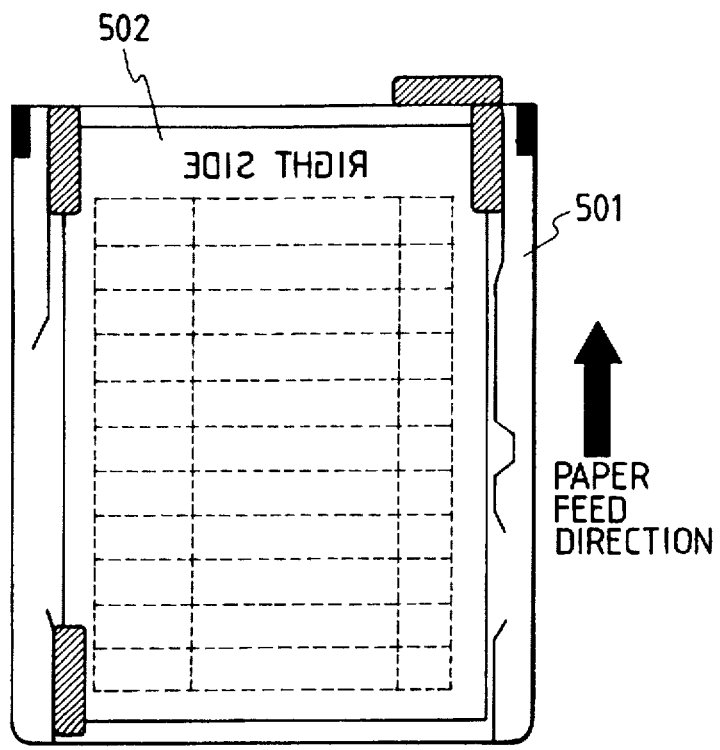
FIG. 7 shows the positional relation similar to that of FIG. 5 in which the pre-print sheet is reversed.
Figure 8:
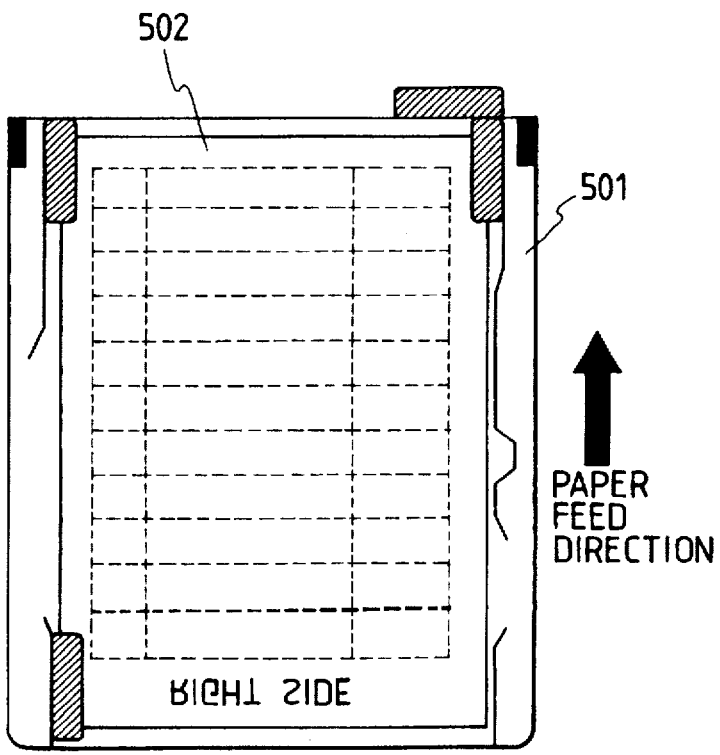
FIG. 8 shows the positional relation similar to that of FIG. 6 in which the pre-print sheet is reversed.

First, FIGS. 5, 6, 7, and 8 show the positional relation between the feed cassette and the pre-print sheet. FIGS. 5 and 6 are as already described above. In FIGS. 7 and 8, reference numeral 501 denotes the feed cassette and 502 indicates the pre-print sheet. FIG. 7 shows a state in which the pre-print sheet has been set into the same direction as that in FIG. 5 and the sheet has been turned over. Similarly, FIG. 8 shows a state in which the pre-print sheet has been set into the same direction as that in FIG. 6 and the sheet has been turned over.

By previously designating whether the pre-print sheet is set to the right side or reverse side and whether the pre-print sheet is set to the NORMAL status or ABNORMAL status by the control data from the host computer 201 or the setting information of the pre-print sheet from the operator's console 209, the correct printing process is subsequently performed. The control data can be also expressed by the page describing language (PDL).

In step S1801, the control program 2005 discriminates whether the pre-print sheet has been designated to the right side or not on the basis of the control data stored in the control data storage area 2102 in the work memory 406, thereby controlling the development program 2003.

When it is determined in step S1801 that the pre-print sheet has been designated to the right side, step S1802 follows and the development program 2003 sequentially develops the bit map for the right side page into the print data development area 2103 in the work memory 406 from the print data stored in the print data storage area 2101 in the work memory 406 by using the font information stored in the font memory 403.

On the other hand, when it is determined in step S1801 that the pre-print sheet has been designated to the reverse side, step S1803 follows and the development program 2003 sequentially develops the bit map for the reverse side page into the print data development area 2103 in the work memory 406 from the print data stored in the print data storage area 2101 in the work memory 406 by using the font information stored in the font memory 403.

In step S1804, the control program 2005 designates a tray to the sheet reversing unit.

In step S1805, the control program 2005 checks whether the pre-print sheet has been designated to the "NORMAL" status or not on the basis of the control data stored in the control data storage area 2102 in the work memory 406, thereby controlling the transfer program 2004.

In step S1805, when it is determined that the pre-print sheet has been designated to the "NORMAL" status, step S1806 follows and the transfer program 2004 sequentially reads out the bit map information from the left and top edge of the developed bit map through the hardware circuit DMAC 404 and the data output interface 407 to transfer the bit map information in which the print data has been developed to the image signal generator 408. The read-out bit map information is supplied to the printer engine 107 as an image signal and printed.

Namely, as shown in 1301 in FIG. 13, by sequentially reading out the bit map information from the developed bit map, a correct print result as shown by 1103 in FIG. 11 is generated to a pre-print sheet as shown by 1101 in FIG. 11.

On the other hand, when it is determined in step S1805 that the pre-print sheet has been designated to the "ABNORMAL" status, step S1807 follows and the transfer program 2004 sequentially reads out the bit map information from the right and bottom edge of the developed bit map through the hardware circuit DMAC 404 and the data output interface 407 to transfer the bit map information in which the print data has been developed to the image signal generator 408. The read-out bit map information is supplied to the printer engine 107 as an image signal and printed.

That is, as shown in 1302 in FIG. 13, by sequentially reading out the bit map information from the developed bit map, a correct print result as shown by 1104 in FIG. 11 is generated to a pre-print sheet as shown by 1102 in FIG. 11.

In the embodiment, the developed bit map is set to the same direction as the setting direction of the pre-print sheet and the bit map information is read out. However, as described in the one-side printing mode, it is also obviously possible to construct in a manner such that the bit map itself is developed in the same direction as the setting direction of the pre-print sheet and the bit map information is always read out from the left and top edge and is generated as an image signal.

The above developing and printing processes can be also executed on the basis of the page describing language (PDL).

Subsequently, to a sheet (image data has already been printed to only one side) which has been delivered to the sheet reversing unit, a printing process to another side is executed.

Explanation will now be made in accordance with the flowchart of FIG. 19. In step S1901, the control program 2005 checks whether the pre-print sheet has been designated to the right side or not on the basis of the control data stored in the control data storage area 2102 in the work memory 406, thereby controlling the development program 2003.

When it is determined in step S1901 that the pre-print sheet has been designated to the right side, step S1902 follows and the development program 2003 sequentially develops the bit map for the reverse side page into the print data development area 2103 in the work memory 406 from the print data stored in the print data storage area 2101 in the work memory 406 by using the font information stored in the font memory 403.

On the other hand, when it is decided in step S1901 that the pre-print sheet has been designated to the reverse side, step S1903 follows and the development program 2003 sequentially develops the bit map for the right side page into the print data development area 2103 in the work memory 407 from the print data stored in the print data storage area 2101 in the work memory 406 by using the font information stored in the font memory 403.

In step S1904, the control program 2005 designates a tray.

Figure 15:
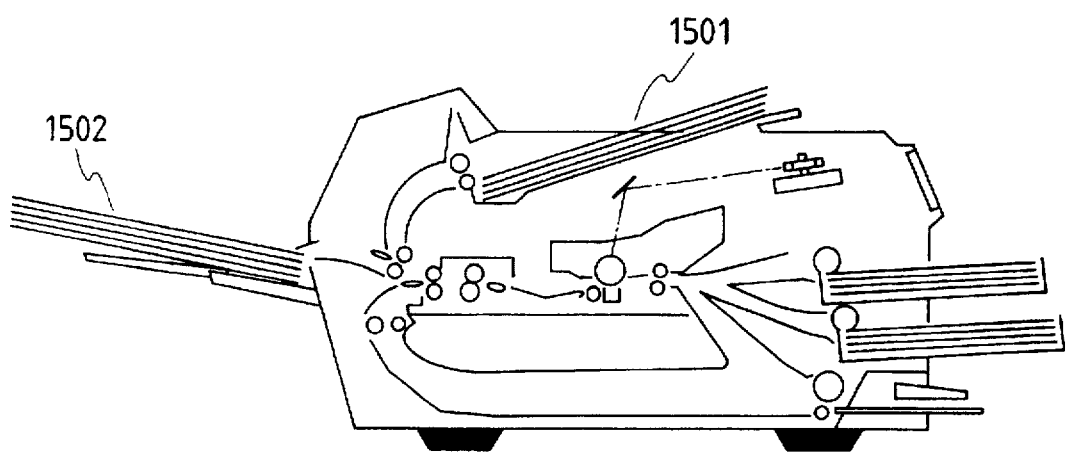
FIG. 15 shows an arrangement of paper cassettes.

It is optimum to overlay the sheets and feed as shown by 1503 in FIG. 15. However, for this purpose, in case of early printing the even-number page to each sheet, a tray indicated by 1501 in FIG. 15 is designated. In case of early printing the odd-number page to each sheet, a tray shown by 1502 in FIG. 15 is designated.

In step S1905, the control program 2005 discriminates whether the pre-print sheet has been designated to the NORMAL status or not on the basis of the control data stored in the control data storage area 2102 in the work memory 406, thereby controlling the transfer program 2004.

When it is determined in step S1905 that the pre-print sheet has been designated to the NORMAL status, step S1906 follows and the transfer program 2004 sequentially reads out the bit map information from the left and top edge of the developed bit map through the hardware circuit DMAC 404 and the data output interface 407 to transfer the bit map information in which the print data has been developed to the image signal generator 408. The read-out bit map information is supplied to the printer engine 107 as an image signal and printed. That is, as shown in 1301 in FIG. 13, by sequentially reading out the bit map information from the developed bit map, the correct print result as shown by 1104 in FIG. 11 is generated to the pre-print sheet as shown by 1102 in FIG. 11.

On the other hand, when it is determined in step S1905 that the pre-print sheet has been designated to the ABNORMAL status, step S1907 follows and the transfer program 2004 sequentially reads out the bit map information from the right and bottom edge of the developed bit map through the hardware circuit DMAC 404 and the data output interface 407 to transfer the bit map information in which the print data has been developed to the image signal generator 408. The read-out bit map information is supplied to the printer engine 107 as an image signal and printed.

That is, as shown in 1302 in FIG. 13A, by sequentially reading out the bit map information from the developed bit map, the correct print result as shown by 1103 in FIG. 11C is generated to the pre-print sheet as shown by 1101 in FIG. 11A.

In the embodiment, the developed bit map is set to the same direction as the setting direction of the pre-print sheet and the bit map information is read out. However, as described in the one-side printing mode, it is also obviously possible to construct in a manner such that the bit map itself is developed in the same direction as the setting direction of the pre-print sheet and the bit map information is always read out from the left and top edge and is generated as an image signal.

The above developing and printing processes can be also executed on the basis of the page describing language (PDL).

(Another Embodiment)

In the embodiment, the laser beam printer using the electrophotographic process has been assumed as a printer mechanism to which the invention can be applied. However, the invention can be also applied to an ink jet printer as shown in FIG. 22 so long as it is page printer for performing the printing process on a page unit basis irrespective of the kind of printer mechanism. The printing apparatus to which the invention is applied is not limited to the above laser beam printer or ink jet printer but the invention can be also obviously applied to printing apparatuses of the other printing systems.

FIG. 22 is an external view showing a structure of a second printing apparatus to which the invention can be applied and shows the case of, for instance, an ink jet printing apparatus (IJRA).

In the diagram, a lead screw 5005 rotates through driving force transfer gears 5011 and 5009 interlockingly with the forward/reverse rotation of a driving motor 5013. A carriage HC comes into engagement with a spiral groove 5004 of the lead screw 5005. The carriage HC has a pin (not shown) and is reciprocatingly moved in the directions shown by arrows a and b. An ink jet cartridge IJC is mounted to the carriage HC. Reference numeral 5002 denotes a paper pressing plate to press a paper onto a platen 5000 in the moving direction of the carriage. Reference numerals 5007 and 5008 denote photo couplers each of which functions as home position detecting means for detecting the existence of a lever 5006 of the carriage in the region corresponding to the photo coupler and for performing the switching of the rotating direction of the motor 5013 or the like. Reference numeral 5016 denotes a member to indicate a cap member 5022 to cap the whole surface of a recording head; 5015 sucking means for sucking the inside of the cap and for performing a sucking recovery of the recording head through an opening 5023 in the cap; 5017 a cleaning blade which can be moved in the front/back directions by a member 5019; 5018 a main body supporting plate to support the cleaning blade 5017 and member 5019; and 5012 a lever to start the sucking of the sucking recovery. The lever 5012 is moved in association with the movement of a cam 5020 which is come into engagement with the carriage. The driving force from the driving motor is transferred and controlled by well-known transfer means such as clutch switching means or the like.

The capping, cleaning, and sucking recovery are constructed in a manner such that a desired process can be executed at the corresponding position by the operation of the lead screw 5005 when the carriage reaches the hold position side region. However, it is sufficient to execute a desired operation at a well-known timing.

It will be obviously understood that the invention can be applied to the ink jet printer with the above construction by adding the control construction of the invention shown in FIG. 4 to the control construction which is peculiar to the ink jet printer.

According to the invention as described above, since the setting (front/back direction, right/reverse, and the like) of the pre-print sheet can be designated by a command which is transmitted from the host computer or by a console operation, the correct print result can be always obtained irrespective of the limitation of the printer mechanism, difference of the printing processes between the one-side printing mode and the both-side printing mode, and the like.

The invention can be applied to a system comprising a plurality of equipment or an apparatus comprising one equipment. The invention can be also obviously applied to the case where the invention is accomplished by supplying a program to embody the invention to such a system or apparatus.

What is claimed is:

1. A printing apparatus capable of printing on both sides of a print sheet, comprising:

developing means for developing received print data into dot data in a development memory, the print data including data for printing on both sides of a single sheet;

input means for inputting first designation information and second designation information;

first determination means for determining the direction in which the received print data is to be printed on a print sheet, in response to the first designation information input by said input means;

second determination means for determining on which side of a print sheet the developed dot data is to be printed first, in response to the second designation information input by said input means; and control means for controlling data output from the development memory in response to an output from said first determination means, and for controlling the development of the received print data so that dot data for one of the two sides of a print sheet is developed before the dot data for the other side in accordance with the output of said second determination means, wherein in developing print data on a certain print sheet, said control means determines whether the print data is to be developed from a top-and-left edge or a bottom-and-right edge of the certain print sheet, the determination by said control means being made in accordance with a combination of the direction determined by said first determination means and the side of the print sheet determined by said second determination means.

2. An apparatus according to claim 1, wherein the print data includes a character code, position information to develop the character code into the development memory, and information indicative of a font pattern which is used when developing.

3. An apparatus according to claim 1, wherein the development memory comprises a bit map memory of at least one page.

4. An apparatus according to claim 1, wherein the first and second designation information is set by a host computer.

5. An apparatus according to claim 4, wherein said control means preferentially controls the order in which the dot information is developed by said developing means based on the information set by the host computer.

6. An apparatus according to claim 1, further comprising means for manually entering the first and second designation information into said input means.

7. An apparatus according to claim 1, wherein said developing means develops the received print data into the development memory on the basis of a page description language.

8. An apparatus according to claim 1, wherein the first and second designation information is included in a page description language.

9. A printing method of printing on both sides of a print sheet, comprising:

a developing step for developing received print data into dot data in a development memory, the print data including data for printing on both sides of a single print sheet;

an inputting step for inputting first and second designation information;

a first determining step for determining the direction in which the received print data is to be printed on a print sheet, in response to the first designation information input in said inputting step;

a second determining step for determining on which side of a print sheet the developed dot data is to be printed first, in response to the second designation information input in said inputting step; and a controlling step for controlling data output from the development memory in response to a determination in said first determining step, and controlling the development of the received print data so that dot data for one of the two sides of a print sheet is developed before the dot data for the other side in accordance with a determination in said second determining steps, wherein in developing print data on a certain print sheet, said controlling step determines whether the print data is to be developed from a top-and-left edge or a bottom-and-right edge of the certain print sheet, the determination by said controlling means being made in accordance with a combination of the direction determined by said first determination step and the side of the print sheet determined by said second determination step.

10. A method according to claim 9, wherein the print data includes a character code, position information to develop the character code into the development memory, and information indicative of a font pattern which is used when developing.

11. A method according to claim 9, wherein the first and second designation information is set by a host computer.

12. A method according to claim 11, wherein the order in which the dot information is developed in said developing step is preferentially controlled by the information set by the host computer.

13. A method according to claim 9, wherein said developing step develops the received print data into the development memory on the basis of a page description language.

14. A method according to claim 9, wherein the first and second designation information is included in a page description language.

* * * * *

UNITED STATES PATENT AND TRADEMARK OFFICE
CERTIFICATE OF CORRECTION

PATENT NO. : 5,768,485
DATED : June 16, 1998
INVENTOR(S) : Masaaki Shimizu

It is certified that error appears in the above-identified patent and that said Letters Patent is hereby corrected as shown below:

COVER PAGE

Under [57] Abstract, line 13, "page." should read --a page.--

IN THE DRAWINGS

Figure 17:
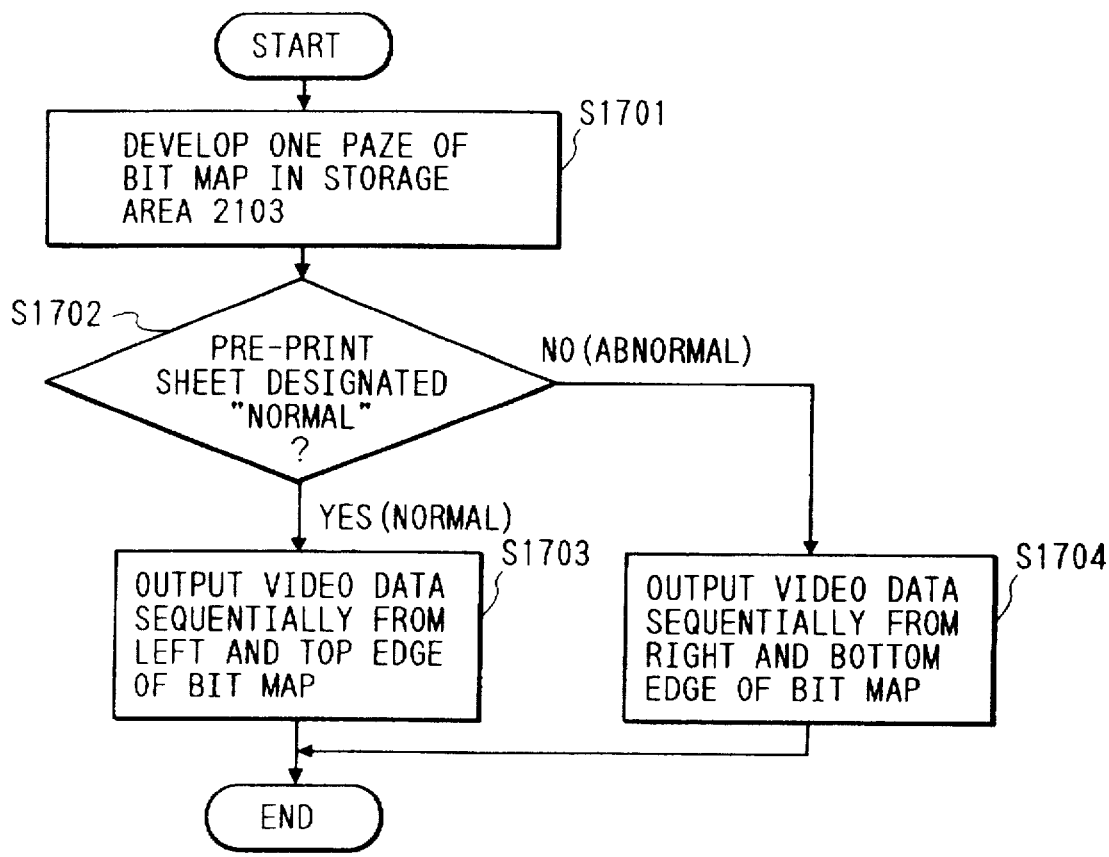
FIG. 17 shows a flowchart for the development and print process of step 1607 in FIG. 16.

Sheet 12, Figure 17, "PAZE" should read --PAGE--.

COLUMN 8

Line 14, ".thereby" should read --thereby--.

COLUMN 10

Line 67, "is" should read --has--.

COLUMN 12

Line 39, "steps," should read --step,--.

Signed and Sealed this

Sixth Day of July, 1999

Attest:

Q. TODD DICKINSON

*Attesting Officer*     Acting Commissioner of Patents and Trademarks